G. DENTZ.
FODDER-CUTTER.

No. 173,274.    Patented Feb. 8, 1876.

Witnesses.
Otto Hufeland
Chas. Wahlers.

Inventor
George Dentz
Van Santvoord & Hauff
attorneys.

UNITED STATES PATENT OFFICE.

GEORGE DENTZ, OF UTICA, NEW YORK.

IMPROVEMENT IN FODDER-CUTTERS.

Specification forming part of Letters Patent No. 173,274, dated February 8, 1876; application filed January 4, 1876.

*To all whom it may concern:*

Be it known that I, GEORGE DENTZ, of Utica, Oneida county, and State of New York, have invented a new and useful Improvement in Fodder-Cutters; which improvement is fully set forth in the following specification, reference being had to the accompanying drawing, in which—

Figure 1:
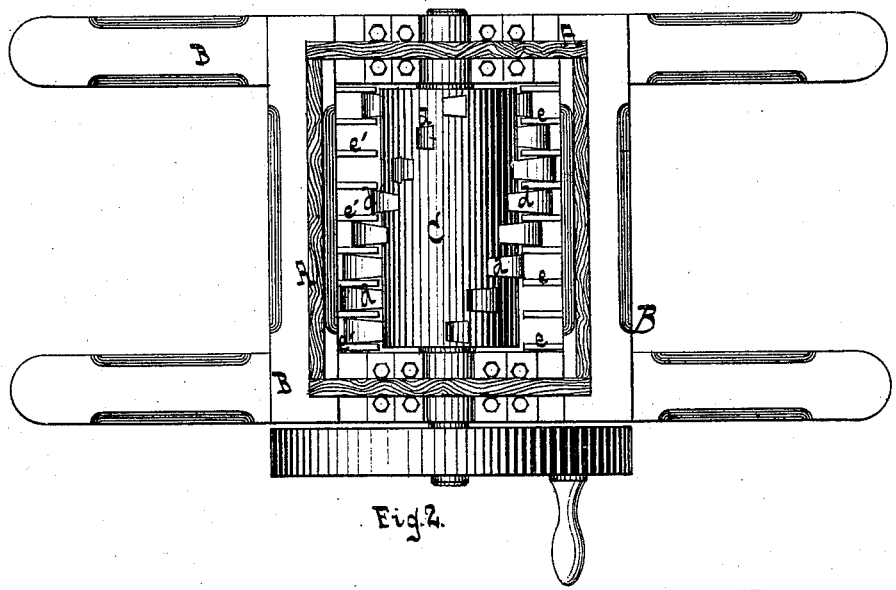
Figure 2:
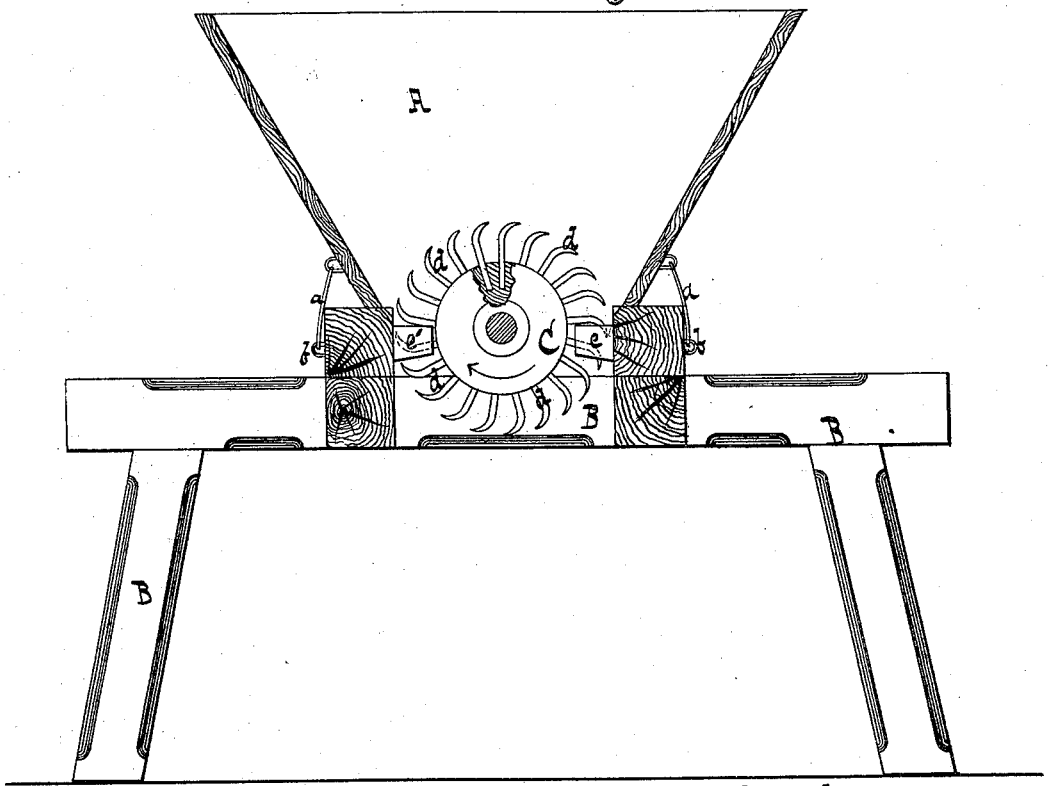

Figure 1 represents a plan view of my improvement. Fig. 2 is a vertical longitudinal section of the same.

Similar letters indicate corresponding parts.

My invention consists in a cutter for corn-stalks and other like substances, which is constructed of a hopper and its supporting-frame, in conjunction with a cylinder which has circumferential teeth and a series of stationary knives, the cylinder and the stationary knives being situated in the lower part of the hopper, and the stationary knives projecting in the direction of the cylinder, and being arranged to alternate with its teeth, in such a manner that when a rotary motion is imparted to the cylinder its teeth cut against the stationary knives, and if fodder is placed in the hopper it is fed, by the action of the teeth, between them and the knives, whereby it is cut, while, by the large effective area presented by the teeth and the stationary knives, a great amount of fodder can be cut in the smallest possible space of time. The teeth of the cylinder are bent in the direction of its rotation, in order to facilitate the grasping of the fodder placed in the hopper, and its being fed between the teeth and the stationary knives. The teeth of the cylinder, moreover, are arranged in a spiral course on the circumference thereof, whereby the teeth are made to cut in succession, or one after the other, and, hence, the cylinder can be turned with very little expenditure of power.

In the drawing, the letter A designates the hopper of my apparatus, which may be made of any selected size; and B is a supporting-frame, to which the hopper is affixed, preferably, by means of hooks and staples *a b*, or by any equivalent means, whereby the hopper is adapted to be removed from the frame, if for any purpose it is desired. In the lower part of the hopper A is mounted a cylinder, C, which has its bearings in the longitudinal bars of the frame B. On the circumference of the cylinder C are fastened, in any suitable manner, a series of teeth, *d*, these teeth being arranged, as seen in Fig. 1, in a spiral course relatively to the axis of the cylinder. In the lower part of the hopper A are situated knives *e*, which are contiguous to, and project in the direction of, the cylinder C, being permanently fastened to the frame B, or to the hopper. These knives *e* are so arranged that they are between the cylinder-teeth *d*; or, in other words, alternate with such teeth. Hence, if a rotary motion is imparted to the cylinder C, the teeth *d* are made to cut in succession against the stationary knives *e* with a shear-like action; and if corn-stalks, hay, straw, or any other substance or fodder is placed in the hopper B, the fodder is caught up by the cylinder-teeth *d*, and brought between them and the knives *e*, whereby the fodder is reduced to a state of fineness, in which condition it falls to the ground, or into a receptacle placed beneath the cutter.

With the stationary cutters *e* and the spiral teeth *d* on the revolving cylinder are combined the clearers *e'*, which are permanently secured in the frame 3, which supports the hopper on the side opposite to the stationary cutters *e*, so that if any parts of the materials to be cut become wedged in between the teeth *d*, such parts are thrown out by the clearers *e'*, and the teeth *d* are prevented from clogging. These clearers are particularly required if my machine is used for cutting up pumpkins, beets, or other articles of a similar nature.

By my apparatus the cutting of a large amount of fodder in the smallest possible space of time is attained, owing to the large effective area presented by the teeth *d* and the stationary knives *e*, compared with a single knife extending the length of the cylinder.

The outer edges of the teeth *d* are bent in the direction of the rotation of the cylinder, as seen in Fig. 2; and by this means the fodder placed in the hopper A is caught up by the teeth with great facility, and fed between them and the stationary knives.

By arranging the teeth *d* spirally on the circumference of the cylinder the teeth are made to cut one at a time, and hence very little power is required for the purpose of turning the cylinder.

My machine can be used with advantage, also, for cutting beets, roots, cabbages, pumpkins, and other articles of a similar nature.

In practice, the knives $e$ will be secured by screws and nuts, so that each can be readily removed for repairs.

By having the hopper A so arranged that it can be readily removed from its supporting-frame B easy access can be had to cutting mechanism for the purpose of sharpening or repairing.

What I claim as new, and desire to secure by Letters Patent, is—

The combination of a series of parallel knives, $e$, projecting inwardly from one side of the frame supporting the hopper, a series of clearers, $e'$, projecting inwardly from the opposite side of said frame, and the cylinder C, having the series of bent teeth $d$, all constructed and operating substantially as shown and described.

In testimony that I claim the foregoing I have hereunto set my hand and seal this 24th day of December, 1875.

GEORGE DENTZ. [L. S.]

Witnesses:
   CHAS. S. DE GIORGI,
   PETER CLEIN.